J. H. WILKINSON.
Wagon-Brake.
No. 53,210. Patented Mar. 13, 1866.
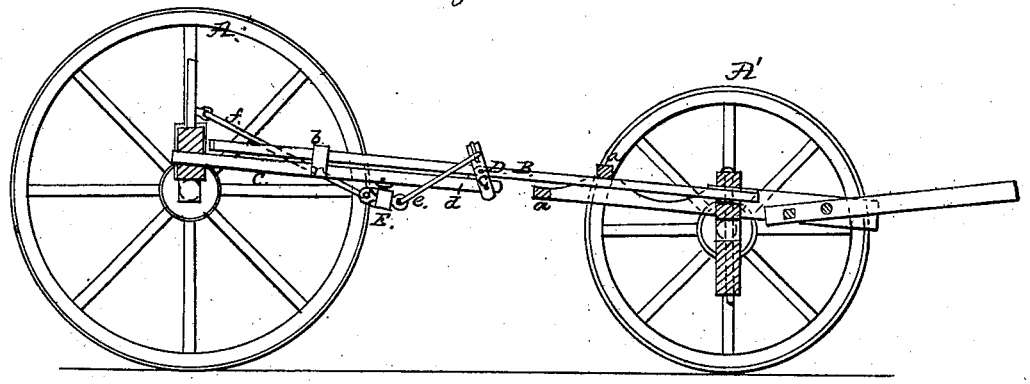
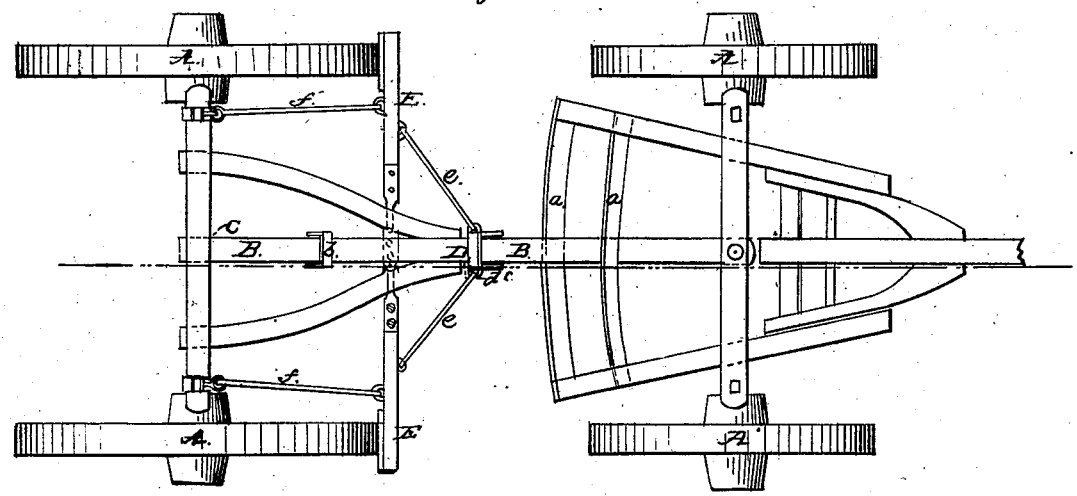
WITNESSES:
Wm Trewin
Wm E. Lyon
INVENTOR:
J. H. Wilkinson
By Munn & Co.
Attorneys

UNITED STATES PATENT OFFICE.

J. H. WILKINSON, OF KICKAPOO, ILLINOIS.

IMPROVEMENT IN WAGON-BRAKES.

Specification forming part of Letters Patent No. 53,210, dated March 13, 1866.

*To all whom it may concern:*

Be it known that I, J. H. WILKINSON, of Kickapoo, in the county of Peoria and State of Illinois, have invented a new and Improved Wagon-Brake; and I do hereby declare that the following is a full, clear, and exact description thereof, which will enable others skilled in the art to make and use the same, reference being had to the accompanying drawings, forming part of this specification, in which—

Figure 1 is a longitudinal vertical section of a wagon-truck with my brake applied thereto, taken through the line $x\,x$, Fig. 2. Fig. 2 is a plan or top view of the same.

Similar letters of reference indicate like parts.

My invention consists in a novel manner of connecting the brakes with a sliding reach of a carriage-truck, whereby the brakes are thrown down to the wheels by the forward tendency of the hind wheels in going downhill, by which I secure a self-acting brake which will regulate itself, and one which will in no manner interfere with the backing of the wagon, as will be presently described.

To enable others to understand my invention, I will proceed to describe it.

A designates the hind, and A′ the forward, wheels of a wagon-truck.

B is a sliding reach, which is secured to the front axle and passes between the transverse bars $a\,a$, as shown clearly in Fig. 2.

C is the stationary reach, which is secured to the hind axle in the usual manner. This extends but a portion of the distance between the two wheels, and the sliding reach rests upon it. A band, $b$, is placed over the sliding reach to keep it in place upon the stationary reach C.

D is a clip, the lower ends of which are bolted to the stationary reach C, as shown clearly in Fig. 1 at $c$, and passes over the sliding reach B, being also bolted to that, as shown at $d$ in Fig. 1. By taking out the bolt $d$ the sliding reach B may be let out, so as to increase the distance between the front and hind wheels, and may be inserted again and secure the parts again in proper position.

E E are the brakes. They are hinged or otherwise secured in a proper manner to the stationary reach C, as shown in Fig. 2, so as to have an up-and-down motion. These brakes are connected to the clip D by rods $e\,e$, one for each brake, which rods are secured to the clip on each side thereof, and they are also connected to the hind axle by two other rods, $f\,f$, which keep the brakes from swinging out of place, all of which is shown clearly in Fig. 2.

The operation is as follows: When the vehicle is drawn along on level ground or uphill the forward pull on the sliding reach B draws forward the top portion of the clip D, which, through the medium of the rods $e\,e$, draws forward the brakes, and rods $f\,f$ cause them to swing upward away from the wheels. It will be seen that the brakes are lifted upward from the wheels. Now, so soon as the vehicle commences descending a hill the stationary reach C will press forward and throw the lower end of the clip D forward, which causes the upper end to force down the brakes or let them fall against the wheels; and it will be seen that the harder the hind wheels press forward the harder will the brakes be held against the wheels, and that so soon as this forward pressure of the hind wheels is released the brakes will slacken of their own accord, and thus the brakes act automatically.

I claim as new and desire to secure by Letters Patent—

1. The rods $e\,e$ and $f\,f$, in combination with the clip D and brakes E E, substantially as shown and described.

2. The clip D, in combination with the sliding reach B and stationary reach C and brakes E E, substantially as and for the purpose specified.

3. The combination of the sliding reach B, stationary reach C, clip D, brakes E E, rods $e\,e$ and $f\,f$, and hind and forward axles of a vehicle, all operating together, substantially as and for the purpose specified.

J. H. WILKINSON.

Witnesses:
G. W. WILKINSON,
JACOB H. WELLS.